US011621844B2

(12) United States Patent
Bankston

(10) Patent No.: US 11,621,844 B2
(45) Date of Patent: Apr. 4, 2023

(54) SECURE DATA TRANSFER SYSTEM AND METHOD

(71) Applicant: Visa International Service Association, San Francisco, CA (US)

(72) Inventor: Michael Steven Bankston, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 230 days.

(21) Appl. No.: 17/268,423

(22) PCT Filed: May 3, 2019

(86) PCT No.: PCT/US2019/030595
§ 371 (c)(1),
(2) Date: Feb. 12, 2021

(87) PCT Pub. No.: WO2020/036660
PCT Pub. Date: Feb. 20, 2020

(65) Prior Publication Data
US 2021/0320799 A1 Oct. 14, 2021

Related U.S. Application Data

(60) Provisional application No. 62/719,502, filed on Aug. 17, 2018.

(51) Int. Cl.
*H04L 9/32* (2006.01)
*H04L 9/08* (2006.01)
(52) U.S. Cl.
CPC .......... *H04L 9/3213* (2013.01); *H04L 9/0847* (2013.01); *H04L 9/3242* (2013.01)
(58) Field of Classification Search
CPC . H04L 63/0815; H04L 9/0894; H04L 9/3239; H04L 9/0847; H04L 9/50;
(Continued)

(56) References Cited

U.S. PATENT DOCUMENTS 9,300,653 B1 * 3/2016 Dufel .................. H04L 63/0428
9,531,697 B2 * 12/2016 Sondhi ................ H04L 63/0815
(Continued)

FOREIGN PATENT DOCUMENTS

WO 2014/005148 A1 1/2014
WO 2017/147696 A1 9/2017
WO 2019/099888 A1 5/2019

OTHER PUBLICATIONS

Extended European Search Report for EP Application No. 19849291.0 dated Apr. 26, 2021, 10 pages.
(Continued)

*Primary Examiner* — Mohammad A Siddiqi
(74) *Attorney, Agent, or Firm* — Kilpatrick Townsend & Stockton LLP

(57) ABSTRACT

Disclosed are methods and systems for securely providing identity attributes. A server computer may receive, from a relying entity, a request for identity attributes associated with a target entity, wherein the request for identity attributes includes a session identifier associated with the target entity and an identifier of the relying entity. The server computer may validate the request based on the session identifier. The server computer may identify, based on the identifier of the relying entity, a package defining types of identity attributes for the relying entity and a data access token associated with the package. Based on validating the request, the server computer may transmit, to a digital identity provider, a request for a set of identity attributes corresponding to the package, the request comprising the data access token. The server computer may receive, from the digital identity provider, the set of identity attributes.

20 Claims, 6 Drawing Sheets

(58) Field of Classification Search
CPC . H04L 9/3242; H04L 9/3213; H04L 2209/56; G06F 21/31; G06F 21/6254
See application file for complete search history.

(56) References Cited

U.S. PATENT DOCUMENTS

| | | | | |
|---|---|---|---|---|
| 2010/0115598 | A1* | 5/2010 | Barriga | H04L 63/0815 726/8 |
| 2013/0091003 | A1* | 4/2013 | Crum | G06Q 30/0207 705/14.26 |
| 2015/0350198 | A1 | 12/2015 | Li et al. | |
| 2016/0294879 | A1 | 10/2016 | Kirsch | |
| 2017/0250972 | A1* | 8/2017 | Ronda | H04L 63/0428 |
| 2017/0302455 | A1 | 10/2017 | Abt, Jr. et al. | |
| 2018/0046856 | A1 | 2/2018 | Kapczynski | |
| 2018/0181964 | A1 | 6/2018 | Zagarese et al. | |
| 2018/0254907 | A1 | 9/2018 | Gasparini | |
| 2019/0149524 | A1* | 5/2019 | Bankston | H04L 9/3239 726/26 |
| 2020/0252408 | A1* | 8/2020 | Bankston | H04L 63/105 |
| 2021/0320799 | A1* | 10/2021 | Bankston | H04L 63/0815 |
| 2021/0350369 | A1* | 11/2021 | Bankston | G06Q 30/0207 |

OTHER PUBLICATIONS

International Search Report and Written Opinion for International Application No. PCT/US2019/030595 dated Aug. 7, 2019, 11 pages.

"Digital Identity Guidelines: Enrollment and Identity Proofing", NIST Special Publication 800-63A, 47 pages. Available at https://doi.org/10.6028/NIST.SP.800-63a.

"An Introduction to Hyperledger", Hyperledger Blockchain Technologies for Business, 33 pages.

Buterin, Vitalik "A Next Generation Smart Contract & Decentralized Application Platform" Ethereum White Paper, 36 pages.

* cited by examiner

SECURE DATA TRANSFER SYSTEM AND METHOD

CROSS-REFERENCE TO RELATED APPLICATIONS

This application is a 371 National Phase Application of International Application No. PCT/US2019/030595, filed May 3, 2019, which claims the benefit of U.S. Provisional Application No. 62/719,502, filed Aug. 17, 2018, which are incorporated herein by reference.

BACKGROUND

A digital identity (DI) may include data associated with a set of information about an entity that can be shared with another entity. Currently, there are many (e.g., hundreds) of DI providers, including government entities and private enterprises. Each DI provider can use a different approach to create a DI, and there is no existing standard for creating a DI. For example, each DI provider can use different content and/or structure for its DIs as well as have different methods of accessing the DIs.

In order to make the information associated with a DI usable to a receiving entity, the information may be extracted from the data and provided to the receiving entity. For example, in an interaction between two entities, each entity may request that the other party provide information in a usable format. However, as the number of interacting entities increases, each DI may come from one of many potential sources. Integration between each individual source of DI and every other source can create an N×N computing problem, where N is the number of sources of DI. As such, the amount of integrations can grow exponentially with each new DI source.

In some cases, a receiving entity may wish to receive personally identifiable information about a target entity. Such information may be stored by one or more DI providers. However, the more entities that are storing and transmitting such personally identifiable information, the greater the risk of unauthorized exposure of such information. Accordingly, there exists a need to securely transfer information associated with a DI.

Embodiments of the disclosure address these and other problems individually and collectively.

BRIEF SUMMARY

Embodiments of the disclosure include methods as well as systems for securely providing identity attributes.

One embodiment of the disclosure is directed to a method comprising: receiving, by a server computer from a relying entity, a request for identity attributes associated with a target entity, wherein the request for identity attributes includes a session identifier associated with the target entity and an identifier of the relying entity; validating, by the server computer, the request based on the session identifier; identifying, by the server computer, based on the identifier of the relying entity, a package defining types of identity attributes for the relying entity and a data access token associated with the package; based on validating the request, transmitting, by the server computer to a digital identity provider, a request for a set of identity attributes corresponding to the package, the request comprising the data access token; and receiving, by the server computer from the digital identity provider, the set of identity attributes.

Another embodiment of the disclosure is directed to a system comprising a server computer programmed to perform the above-noted method.

Another embodiment of the disclosure is directed to a method comprising: generating, by a client computer of a relying entity, a request for a plurality of identity attributes associated with a target entity, wherein the request for identity attributes includes a session identifier associated with the target entity and an identifier of the relying entity; transmitting, by the client computer, the request to a server computer; thereby causing the server computer to: validate the request based on the session identifier; identify, based on the identifier of the relying entity, a package defining types of identity attributes for the relying entity and a data access token associated with the package, transmit, to a digital identity provider, a request for a set of identity attributes corresponding to the package, the request comprising the data access token, receive, from the digital identity provider, the set of identity attributes, and transmit, to the client computer of the relying entity, the set of identity attributes; and receiving, by the client computer of the relying entity, the set of identity attributes.

Another embodiment of the disclosure is directed to a system comprising a client computer programmed to perform the above-noted method.

Further details regarding various embodiments can be found in the Detailed Description and the Figures.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements and in which.

Figure 1A:
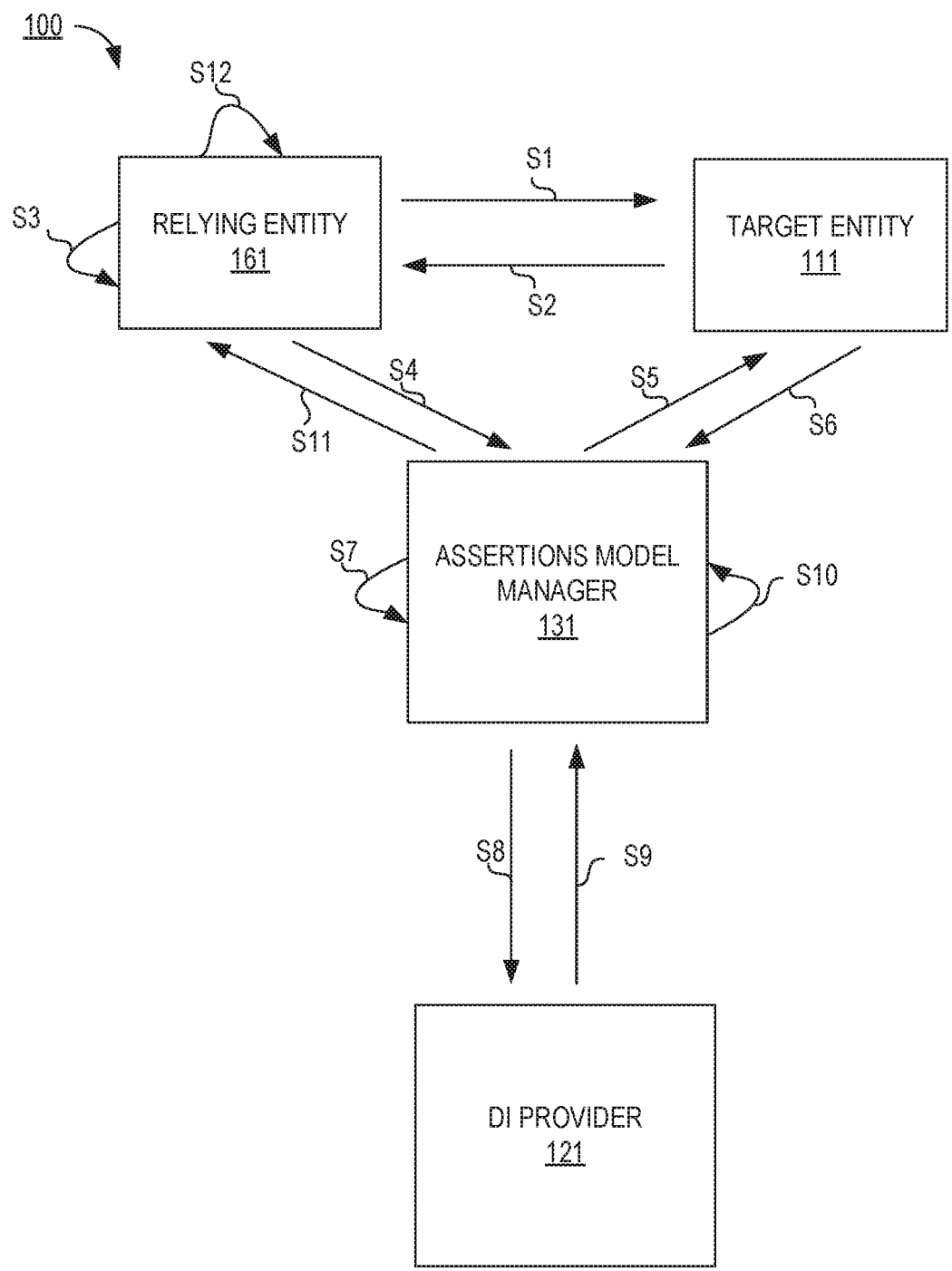
FIG. 1A is a schematic diagram of a system and method for providing at least one identity attribute according to a non-limiting embodiment.

While each of the figures illustrates a particular embodiment for purposes of illustrating a clear example, other embodiments may omit, add to, reorder, and/or modify any of the elements shown in the figures.

DETAILED DESCRIPTION

Definitions

Prior to discussing various embodiments, some terms can be described in further detail.

The term "identifier" may refer to any information that may be used to identify something. In some embodiments, the identifier may be a special value generated randomly or according to a predetermined algorithm, code, or shared secret. For example, an individual may be identified using a driver's license number or a cryptographic key. In some embodiments, the identifier may be in the form of one or more graphics, a token, a bar code, a quick response (QR) code, or any other information that may be used to uniquely identify an entity.

An "identity attribute" may refer to a particular piece of information about an entity (e.g., person, organization, thing, or the like). Examples of identity attributes include a social security number, an age, a phone number, and a bank account number associated with a person.

A "digital identity" (DI) may include a secure set of information about an entity (e.g., a person, organization, or thing). A DI may comprise a plurality of identity attributes, as well as a digital identity identifier that identifies the digital identity. For example, a DI for a user, Joe Smith, may include identity attributes such as the user's date of birth, social security number, address, and driver's license number, as well as an identifier such as Joe_Smith_1234 which is used to identify Joe Smith's digital identity. The DI may be made available to another entity in a secure manner. DIs may rely on agreements among stakeholders and security measures such as cryptography.

An "assertion" (sometimes referred to as an "assertion value") may refer to a secure fact about an entity. An assertion can protect information while being useful to achieve a particular goal. For example, an assertion may specify something about an entity, such as whether the entity should be allowed to purchase alcohol in a particular location. The assertion may be "Jane Doe is old enough to purchase alcohol in California." This assertion can be used by a bar in its decision to serve alcohol to a person, instead of conveying the person's driver's license information to the bar. As another example, an assertion may specify whether an entity has an account which can accept deposits (e.g., "Jane Doe has a bank account and can accept deposits.").

A "type of assertion" may be a category of assertions, e.g., whether an entity has at least $100 in a bank account. The "assertion" or "assertion value" associated with the type of assertion may be a corresponding answer for a particular entity, which may in the form of "yes" or "no," or may be an affirmative statement (e.g., "Jane Doe has $100 or more in her bank account."). An assertion may be secured cryptographically. An assertion may be digitally signed by the entity of interest and/or the trusted party providing the secure facts.

An "assertions model" may be a set of assertion types that may be associated with a particular entity. An assertions model may specify one or more types of assertions. For example, an assertions model may include two types of assertions: whether an entity is old enough to rent a car and whether the entity has a valid driver's license. An assertions model may be tailored to a particular situation. Continuing with the previous example, whether an entity is old enough to rent a car and whether the entity has a valid driver's license may correspond to an assertions model for the context of a prospective car renter interacting with a rental car agency. An assertions model may further specify a set of identity attributes.

A "target entity" may refer to an entity corresponding to an assertion, DI, and/or identity attribute. For example, a target entity may be Mary Jones. An assertion about Mary Jones may specify whether Mary Jones is old enough to purchase alcohol in a particular location. A related identity attribute for Mary Jones may be Mary Jones's exact age (e.g., 35 years old).

A "relying entity" may refer to an entity that may receive an assertion, DI, and/or identity attribute. For example, the relying entity may be a bar that requests an assertion whether a target entity is old enough to be served alcohol.

A "data access token" or "access token" may refer to a token for use in validating Application Programming Interface (API) requests. A data access token may represent authorization for an application to access specific data elements associated with a target entity. As an example, a data access token may comprise a set of permissions which allow an application to retrieve two specific identity attributes associated with a target entity from an API associated with the target entity's bank—the target entity's date of birth and the target entity's address. A data access token may be secured for use by a particular application or entity, e.g., using a digital signature.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key.

A "private key" may include a cryptographic key that forms a private key of a public/private key pair. A private key may be used to decrypt data encrypted with a public key.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "hash" may refer to a fixed-length output of a hashing algorithm. Such an output may be generated based on an input string of any length. Some hashes may be generated and reversed cryptographically. Hashes may be stored associatively to a hash table, which may accelerate table lookup or data comparison tasks such as finding items in a database.

A "Uniform Resource Indicator" or "URI" may refer to a string of characters which unambiguously identifies a particular resource. URIs may be used to define a path to the resource. A common type of URI is a Uniform Resource Locator (URL). URLs are used in the context of web resources. A URL may specify a location of a web resource on a computer network and a mechanism for retrieving the web resource.

A "session identifier" or "session ID" may refer to an identifier assigned to a specific user for the duration of a session (e.g., a series of related network communications such as a visit to a website). A session identifier may be maintained during the course of a session (e.g., until the user closes a browser or logs out of an application). A session identifier may be generated and stored by a server computer with which the user is interacting, e.g., as a URI, cookie, or form field. In some cases, security measures may be implemented to prevent malicious hijacking of a session ID. For example, a session ID may be linked to an Internet Protocol (IP) address of the user or encrypted using a key assigned to the user.

A "distributed ledger" may refer to a database that is shared among multiple nodes across a network. Entities corresponding to each node may store identical copies of the ledger at a given time. The entities may have permission to make changes or additions to the ledger. When the ledger is changed, the participating entities may receive the updated ledger. Examples of distributed ledgers include a blockchain, wherein transactions are verified before being encrypted and recorded to the ledger in a block of transactions.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

A "processor" may refer to any suitable data computation device or devices. A processor may comprise one or more microprocessors working together to accomplish a desired function. A processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

The terms "client" and "client device" may include one or more client-side devices or systems capable of obtaining information and applications from a server. As an example, a "client device" may include one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), PDAs, and/or other like devices. Moreover, a "client" may be an entity, such as a merchant, that owns, utilizes, and/or operates a client device for initiating transactions with a transaction service provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Securely Providing Identity Attributes

PCT Application PCT/US18/61600 (hereby incorporated by reference in its entirety) describes systems and methods for providing a package of assertions to a relying entity. The system may store various packages of assertions tailored to different relying entities or types of relying entities. For Example, for a relying entity that provides home loans, the system may store a package of assertions specifying (a) whether a target entity earns at least $80,000 a year, (b) whether the target entity has made payments on time for all accounts for the last year, and (c) whether the target entity has at least $30,000 in savings. The relying entity may retrieve, from the system, the package of assertions to prequalify the target entity for a mortgage. At a later time, when the target entity is ready to take out a home loan, the assertions may not be enough for the relying entity. The relying entity may require identity attributes specifying the target entity's exact income, assets, and credit history when it comes time to issue the loan. As another example, a relying entity may complete an initial enrollment process with a target entity using information based on a set of identity attributes. The relying entity may, for security purposes, refrain from storing the identity attributes. The relying entity may later request assertions about the target entity to confirm that the information is up-to-date. The system described with respect to FIG. 1A provides a method of securely providing a package of identity attributes to a relying entity, which may be based on a package of assertions for the relying entity.

Referring now to FIG. 1A, a schematic diagram of an example system and method 100 for providing at least one identity attribute is shown according to a non-limiting embodiment. For simplicity of illustration, a certain number of components and operations are shown in FIG. 1A. It is understood, however, that embodiments may include more than one of each component. In addition, some embodiments may include fewer than or greater than all of the components and operations shown in FIG. 1A.

The system 100 may include a relying entity 161, a target entity 111, an assertions model manager 131, and a DI provider 121, as described in detail below with respect to FIGS. 1B-1C. Each of these entities may operate a computer. For example, target entity 111 may operate a target entity computer and DI provider 121 may operate a DI provider computer.

At step S1, the relying entity 161 may request permission, from the target entity 111, to initiate retrieval of identity attributes related to the target entity 111. The relying entity 161 may request the permission, as examples, by transmitting a request message to the target entity 111, or by displaying, to the target entity 111, a modal comprising "Yes" and "No" buttons for user selection. The relying entity 161 may require the identity attributes in order to perform some function. As a specific example, the target entity 111 may be using a website of the relying entity 161 to book a hotel room. The booking may involve entering various identity attributes into a form, such as a name, an address, payment information, a loyalty account number, and the like. The relying entity 161 may notify the target entity 111 that, if desired, the relying entity 161 can gather such information.

At step S2, the target entity 111 may transmit a response to the relying entity 161. The target entity 111 may transmit a response indicating permission to retrieve the identity attributes. The relying entity 161 may receive the response.

At step S3, the relying entity 161 may prepare a request for identity attributes. The request may include an identifier of the relying entity 161, such as a cryptographic key (e.g., a public key of the relying entity), user name, identification number, or the like.

In some embodiments, the request may include information associated with the target entity 111. The information associated with the target entity 111 may include an identifier of the target entity such as a cryptographic key, user name, identification number, or the like. Alternatively, or additionally, the target entity 111 may be identified using a session identifier. The session identifier may have been generated by the relying entity 161 in association with a communication session with the target entity 111. For example, prior to step S1, the relying entity 161 may establish a communication session with the target entity. The relying entity 161 may generate a session identifier, associated with the target entity 111, for the communication session. In some cases, the session identifier may be derived from a target entity identifier and a relying entity identifier, and, optionally, a random value or timestamp. During the course of the communication session, the relying entity 161 and the target entity 111 may engage in a series of communications over a network, including those described above with respect to steps S1 and S2.

In some embodiments, the request may include additional information. The received request may include an address or resource locator such as a Uniform Resource Identifier (URI). The URI may identify a location to which to transmit the identity attributes. The request may further comprise the desired identity attribute(s) or an indication of the permission granted by the to the relying entity 161 by the target entity 111.

At step S4, the relying entity 161 may transmit the prepared request to the assertions model manager 131. In some embodiments, the relying entity 161 may push the request to an API exposed by the assertions model manager 131. Alternatively, or additionally, the relying entity may transmit a request message to the assertions model manager 131.

In some embodiments, the assertions model manager 131 may receive the request and validate the request based on the session identifier. The assertions model manager 131 may, for example, compare the session identifier to the identifier of the target entity to confirm that the session indeed involves the target entity 111. If the assertions model manager 131 cannot validate the request based on the session identifier (e.g., the session is associated with the relying entity 161 and another entity different than the target entity 111), then the assertions model manager 131 may refrain from proceeding to retrieve the identity attributes.

At step S5, the assertions model manager 131 may request, from the target entity 111, permission to access the identity attributes. In some embodiments, although the relying entity 161 may indicate receipt of permission, the assertions model manager 131 may independently request permission for added security. Such a request may include requesting permission to provide the identity attributes to the relying entity 161. In some embodiments, the assertions model manager 131 may further request step-up authentication from the target entity 111. The assertions model manager 131 may, for example, cause display of a modal for the target entity 111 to log in to an account. The target entity 111 may, for example, log into an identity management account previously established with the assertions model manager 131 and/or the DI provider 121. As another example, the assertions model manager 131 may send a validation code to a known phone number or email address of the target entity 111, which the target entity 111 must provide back to the assertions model manager 131 in order to proceed.

At step S6, the target entity 111 may transmit a response to the assertions model manager 131, indicating whether permission to access the identity attributes and/or provide the identity attributes to the relying entity 161 is granted. The assertions model manager 131 may receive a response message indicating whether permission to access the identity attributes and/or provide the identity attributes to the relying entity 161 is granted.

At step S7, the assertions model manager 131 may identify a package defining types of identity attributes for the relying entity, and identify one or more data access tokens associated with the package. The assertions model manager 131 may identify the package defining types of identity attributes for the relying entity based on the identifier of the relying entity. For example, the assertions model manager 131 may identify a stored mapping of relying entity identifiers to assertions models.

The package may be a package of assertions, as described in detail below with respect to FIGS. 1C and 3. Alternatively, the package may list one or more types of identity attributes without including assertions. In either case, the package corresponds to a set of information which the relying entity 161 is entitled to receive. For example, the relying entity 161 may be an online merchant. The assertions model manager 131 may have previously established a package of identity attributes that the relying entity 161 can be given: name, address, and payment information.

A data access token may be associated with one or more assertions and/or identity attributes. Based on, or in connection with, the identified data access token, the assertions model manager may identify one or more DI providers that hold the associated identity attribute(s). As an example, a DI provider identifier may be stored in association with the token. The assertions model manager may identify the appropriate DI provider based on the DI provider identifier. As another example, the data access token may specify a path to an API of the DI provider.

The data access token may directly map to the set of identity attributes. For example, at an initial time, the assertions model manager 131 may store a data access token which can be used to retrieve, from a particular DI provider 121, a set of identity attributes defined by the package for the relying entity 161. Alternatively, or additionally, there may potentially be more than one data access token associated with a given package defining types of identity attributes for the relying entity. The identity attributes may be stored by multiple DI providers.

In some embodiments, a DI provider 121 may provide the assertions model manager 131 with one or more identity attributes that should not be returned to the relying entity 161. The relying entity 161 may only receive a specific set of relevant identity attributes, which can be determined by the package. In some embodiments, the assertions model manager 131 may determine which of the identity attributes the relying entity 161 is permitted to have based on the package for that relying entity 161. As an example, a package for a car rental agency may include driver's license number, name, and date of birth. The car rental agency may not be entitled to other attributes, such as bank account number or social security number.

At step S8, the assertions model manager 131 may transmit, to the DI provider 121, a request for a set of identity attributes corresponding to the package. The request may comprise the data access token. The assertions model manager 131 may, for example, push the identified data access token to an API exposed by the DI provider 121. The assertions model manager 131 may provide the DI provider 121 with the data access token in order to retrieve the identity attributes. Alternatively, or additionally, the assertions model manager 131 may provide the token to third-party service (e.g., a token-based API service) to facilitate retrieval of the identity attributes. The assertions model manager 131 may perform an API call identifying the token and/or requesting the identity attributes associated with that token.

At step S9, the DI provider 121 may retrieve a set of identity attributes, based on the retrieved data access token, and transmit the set of identity attributes to the assertions model manager 131. The assertions model manager 131 may then receive the set of identity attributes from the DI provider 121. As an example, the assertions model manager 131 may receive, from the DI provider 121, three identity attributes: Joe Johnson's date of birth, Joe Jonson's driver's license, and Joe Johnson's name.

At step S10, the assertions model manager 131 may process the received set of identity attributes to form a message for transmitting to the relying entity 161. The assertions model manager may package the relevant identity attributes, as well as generating a message digest for inclusion in the message.

The assertions model manager 131 may compute, via a hash function and the set of identity attributes, a message digest. As an example, to create a message digest using the set of relevant identity attributes, the assertions model manager 131 may hash the set of identity attributes. Such a message digest may be used to determine whether the attributes have been changed in some form.

In some embodiments, a Merkle tree may be generated. A Merkle tree may be generated by hashing each identity attribute, then using generating a second level of hashes using pairs of the hashes of the identity attributes, then generating a third level of hashes using pairs of the second level of attributes, and so forth, until a top-level hash ("Merkle root") is generated based on a penultimate level of attributes. For example, the assertions model manager may generate a plurality of hash values by hashing a first identity attribute, of the set of identity attributes, to generate a first hash value, hashing a second identity attribute, of the set of identity attributes, to generate a second hash value, hashing the first hash value and the second hash value to generate a third hash value, and so forth. A Merkle tree serves as a hierarchical tree that makes it possible, not only to determine that the attributes have been changed (as in the case with the message digest), but also to determine exactly which attribute(s) have been changed. The assertions model manager may store one or more of the message digest, the Merkle tree, and/or the Merkle root, for later establishing the integrity of the data received by the relying entity.

In some embodiments, the assertions model manager may generate a JavaScript Object Notation (JSON) message comprising the relevant identity attributes and the message digest and/or Merkle root. The message may further include a package identifier. The package identifier may be an identifier of the particular package of attributes identified by the assertions model manager 131. In some embodiments, the assertions model manager may encrypt the identity attributes prior to transmitting the message (e.g., using a key of the relying entity 161).

At step S11, the assertions model manager 131 may transmit the set of identity attributes to the relying entity 161. Along with the identity attributes, the assertions model manager may transmit the message digest, the package identifier, and/or additional data. The identity attributes and associated data may be delivered to the URI that was provided in the original request from the relying entity 161.

At step S12, the relying entity 161 may perform an action using the received identity attributes. As examples, the relying entity 161 may use the identity attributes to auto-fill a form related to the target entity 111, or to transmit the attributes to the target entity 111. If the identity attributes are received in an encrypted from, then the relying entity 161 may first decrypt the identity attributes (e.g., using a public key of the relying entity).

Systems

Figure 1B:
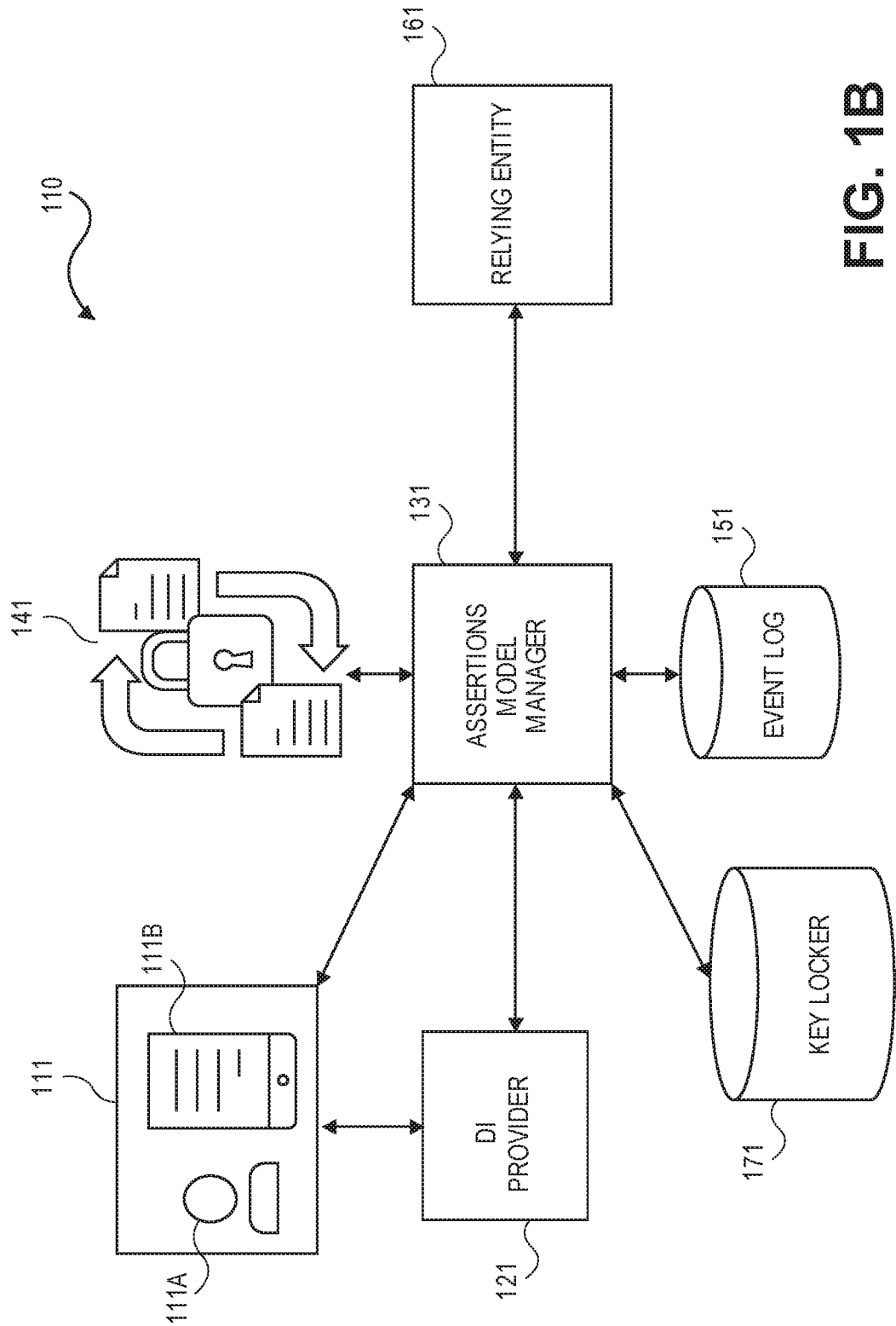
FIG. 1B is a block diagram of a system for providing at least one identity attribute, including additional elements according to a non-limiting embodiment.

Referring now to FIG. 1B, a schematic diagram of an example system 110 for providing identity attributes is shown according to a non-limiting embodiment. System 110 illustrates only one of many possible arrangements of components configured to execute the programming described herein. Other arrangements may include fewer or different components, and the division of work between the components may vary depending on the arrangement.

The system 110 can include a DI provider 121, an assertions model manager 131, a relying entity 161, an event log 151, a ledger of assertions 141, a target entity 111, and a key locker 171. The components of the system 110 may all be in operative communication with each other through a communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the entities, providers, networks, and devices illustrated in FIG. 1B may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), International Organization for Standardization (ISO, e.g., ISO 8583) and/or the like.

The target entity 111 may be an entity for which one or more identity attributes and/or assertions are provided (i.e., the identity attributes and/or assertions are about the target entity 111). The target entity 111 may include a user 111A. The term "target entity" may refer to an individual (e.g., a customer, a consumer, and/or the like), a business or other legal organization, a government agency, and/or the like.

In some non-limiting embodiments, the target entity 111 may be assigned an identifier ("an identifier of the target entity"). The identifier of the target entity may include data associated with a digital signature and/or cryptographic key of the target entity 111. Alternatively, or additionally, the identifier of the target entity may include an ID number, a QR code, and/or the like.

The DI provider 121 may manage one or more digital identities (DIs) associated with a target entity 111. As described above, a DI can include data associated with a set of information about an entity that can be shared with another entity. The DI provider may be an issuer, an acquirer, a transaction service provider, a government agency, and/or the like. The DI provider 121 is configured to create and store DIs. The DI provider may provide information about a target entity.

The DI provider 121 may retrieve data from another source. Such a primary source of information is referred to herein as a reference. References are generally trusted sources of information. A reference may be a verified document (e.g., a birth certificate, driver's license, password, credit card, etc.). Alternatively, or additionally, a reference may be an entity, such as a government agency, bank, individual, etc., that can provide trusted information.

The DI provider 121 may be assigned an identifier ("an identifier of the DI provider"). The identifier of the DI provider 121 may include data associated with a digital signature and/or cryptographic key of the DI provider 121.

The relying entity 161 may be an entity that can receive information about the target entity 111. The relying entity 161 may be any entity requesting information (e.g., identity attributes and/or assertions) about the target entity 111. For example, the relying entity 161 may be a merchant requesting information about a target entity 111 initiating a payment transaction. Additionally or alternatively, the relying entity 161 may be an entity (e.g., a government agency or business organization) requesting information about the target entity 111 with respect to a non-payment interaction (e.g., granting the target entity 111 access to a secured area or event venue). The relying entity 161 may be configured to fetch identity attribute(s) associated with the target entity 111 by sending a request to the assertions model manager 131.

In some non-limiting embodiments, the relying entity 161 may be assigned an identifier ("an identifier of the relying entity"). The identifier of the relying entity may include data associated with a digital signature and/or cryptographic key of the relying entity 161.

The relying entity 161 may be associated with one or more client computers, each of which may include a non-transitory computer readable medium coupled to a processor. These components may be substantially similar to, or different from, those described below with respect to FIG. 1C.

Figure 1C:
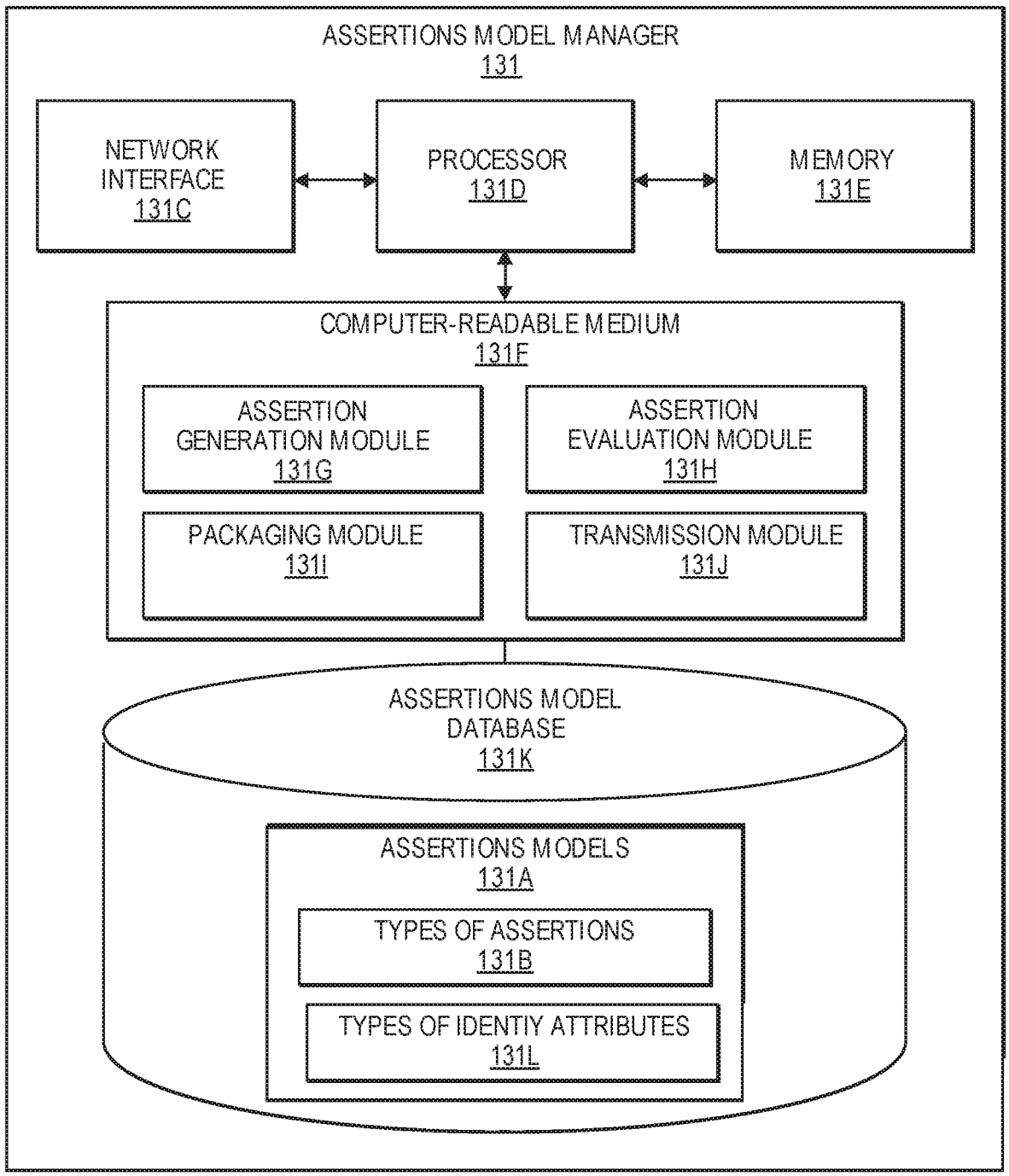
FIG. 1C is a block diagram of an assertions model manager according to a non-limiting embodiment.

Referring now to FIG. 1C, the assertions model manager 131 may include hardware and/or software configured to generate a package based on an assertions model 131A. The assertions model manager 131 may include a processor 131D operatively coupled to a network interface 131C, a memory 131E, and a computer-readable medium 131F. The assertions model manager 131 may further include an assertions model database 131K.

The assertions model database 131K may be a storage unit and/or device (e.g., a file system, database, collection of tables, or other storage mechanism) for storing data. The assertions model database 131K may include multiple different storage units and/or devices. The assertions model database 131K may store assertions models 131A, types of assertions 131B, and types of identity attributes 131L.

In some embodiments, a type of assertion 131B may correspond to a generic assertion, e.g., whether an entity has had a relationship with a bank for one year or longer. A type of assertion 131B may correspond to an assertion value which may be a true/false, yes/no, and/or affirmative statement. As an example, a type of assertion may correspond to whether a target entity is a United States citizen. The corresponding assertion value is "yes."

When an answer is provided corresponding to a type of assertion 131B and a particular target entity, e.g. "yes, Joe Smith is a United States citizen," this may be referred to as an "assertion value." The assertion value may be combined with supplemental data and/or formatted so as to generate an "assertion object."

A type of assertion 131B may correspond to a type of identity attribute 131L. A type of identity attribute 131L may be a type of data stored by a DI provider 121. Examples of types of identity attributes include a name, a date of birth, and a place of employment. A type of assertion 131B may map to one or more types of identity attributes 131L. As an example, the type of assertion 131B "whether United States citizen" corresponds to the type of identity attribute 131L "citizenship." A type of identity attribute 131L, for a given target entity 111, may, in turn, correspond to a particular identity attribute. For example, the type of identity attribute 131L, citizenship, for Joe Taylor, corresponds to the identity attribute "Canadian." Based on an identified type of identity attribute 131L, the assertions model manager may locate corresponding identity attribute data (e.g., from the DI provider 121 shown in FIG. 1B).

An assertions model 131A may specify one or more types of assertions 131B and/or types of identity attributes 131L. For example, a particular assertions model 131A may include three types of assertions 131B—whether the target entity 111 is an employee of Widget Corp., whether the target entity 111 has a valid security clearance, and whether the target entity 111 is a United States Citizen. An assertions model 131A may map to one more types of identity attributes 131L associated with the types of assertions 131B. For example, a particular assertions model 131A may include two types of assertions: (1) whether the target entity is a resident of Texas (a type of assertion) and (2) whether the target entity is at least 18 years of age (a type of assertion). These assertions may be associated with corresponding types of identity attributes 131L stored by the DI provider 121: (1) the target entity's residence address and (2) the target entity's date of birth. Alternatively, or additionally, an assertions model 131A may specify a set of types of identity attributes 131L, without specifying types of assertions 131B.

The assertions model 131A may specify additional information. The assertions model 131A may specify a name of the assertions model. The assertions model 131A may specify a context (e.g. social media or online banking). The assertions model 131A may specify an authentication method (e.g., an appropriate authentication method determined based on the type of relying entity, which may include credentials). The assertions model 131A may further specify a method of combining or rating the assertions, a name/identifier and current version number of the assertions model, and/or the date on which the assertions model was last updated.

An assertions model 131A may be tailored to one or more types of relying entities or domains (e.g., there may be an assertions model for ecommerce, an assertions model for government entities, an assertions model for bars, an assertions model for rental car companies, etc.). As an example, an assertions model for the type of relying entity "liquor store" may include two types of assertions 131B: (1) whether the target entity is 21 or older and (2) whether the target entity has access to at least $5 in a payment account. Alternatively, or additionally, an assertions model may be tailored to a specific relying entity (e.g. a particular store, a particular restaurant, etc.). As an example, an assertions model 131A for Joe's Liquor may include two types of assertions 131B: (1) whether the target entity is 21 or older and (2) whether the target entity has at least $50 in a payment account. Additionally or alternatively, assertions models may vary according to the target entity 111 and/or DI provider 121.

An assertions model 131A may further be tied to the underlying identity attributes. Continuing with the above example of Joe's Liquor, Joe may become suspicious of a customer (i.e., a target entity) and wish to obtain the customer's actual age and payment information. The assertions model 131A for Joe's Liquor may be stored in association with a data access token which can be used to retrieve the customer's date of birth and payment information from the customer's bank.

In some embodiments, each assertions model 131A may map to a plurality of relying entities 161 and/or types of relying entities. The assertions model manager 131 may, for example, store such mappings to the assertions model database 131K.

In some embodiments, the assertions models 131A may be generated by the assertions model manager. For example, the assertions model manager may generate one or more assertions models corresponding to a relying entity that seeks to deposit funds into an account. The assertions model(s) may be generated, for example, based on historical data specifying information requested by such entities (e.g., the name of the account holder, whether the account can accept deposits, etc.). Alternatively, or additionally, the assertions model manager may obtain assertions models from, or in cooperation with, other entities in the system (e.g., the relying entity 161, the target entity 111, and/or the DI provider 121). As an example, the target entity, an individual, may submit information to an Application Programming Interface (API) exposed by the assertions model manager 131 specifying that the individual only wishes to allow liquor stores to obtain an assertion whether the individual is at least 21 years old.

The network interface 131C may be configured to connect to one or more communication networks to allow the assertions model manager 131 to communicate with other entities such as the DI provider 121, the relying entity 161, the target entity 111, etc. For example, communication with the assertions model manager 131 can be direct, indirect, and/or via an API.

The processor 131D may be implemented as one or more integrated circuits (e.g., one or more single core or multicore microprocessors and/or microcontrollers). The processor 131D may be used to control the operation of the assertions model manager 131. The processor 131D can execute a variety of programs in response to program code or computer-readable code stored in memory 131E. The processor 131D may include functionality to maintain multiple concurrently executing programs or processes.

The memory 131E may be implemented using any combination of any number of non-volatile memories (e.g., flash memory) and volatile memories (e.g., DRAM, SRAM), or any other non-transitory storage medium, or a combination of media.

The computer-readable medium 131F may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 131F may be any combination of such storage or transmission devices.

The computer-readable medium 131F may comprise software code stored as a series of instructions or commands The computer-readable medium 131F may comprise an assertion generation module 131G, an assertion evaluation module 131H, a packaging module 131I, and a transmission module 131J.

In some embodiments, the assertion generation module 131G includes software and/or hardware configured to generate assertions. The assertion generation module 131G may, in conjunction with the processor 131D, use an assertions model 131A, and/or information specified by the relying entity 161, to identify one or more types of identity attributes 131L corresponding to a particular type of assertion 131B. For example, the assertions model manager 131, in conjunction with the processor 131D, generates an assertion whether the target entity 111 has had a banking relationship with a particular DI provider 121 for two years or more. The assertion generation module 131G may, in conjunction with the processor 131D, determine, e.g., using a look-up table or mapping, that the assertion corresponds to the identity attribute data "account status" and "date of opening first account." The assertion generation module 131G may include code configured to retrieve the corresponding identity attribute data from the DI provider. The assertion generation module 131G may include code configured to compute an assertion value, based on the retrieved identity attribute data.

The assertion evaluation module 131H includes software and/or hardware configured to evaluate assertions. The assertion evaluation module 131H may, in conjunction with the processor 131D, compute a strength score for an assertion. As an example, the assertion evaluation module 131H may, in conjunction with the processor 131D, compute a strength score for an assertion based on a latest update to the underlying identity attribute data, a reference source of the underlying attribute data (e.g., a driver's license, or a statement from an individual), and/or the DI provider 121 associated with the underlying attribute data. For example, a social media assertion is generated based on only a validated email address. Accordingly, the social media assertion is assigned a relatively "weak" score. A DI provider 121 may generate an assertion using identity attribute data confirmed using a state document like a driver's license, proof of address, background checks of the data against several different databases (e.g. credit history), and a bank clerk looking at the target entity to verify that the individual matches the presented driver's license picture. Accordingly, an assertion from a DI provider 121 which is a bank may produce a relatively "strong" score indicating confidence in the assertion, derived as a function of the root identity attribute data, the verifications performed, and/or confidence in the DI provider 121.

The assertion evaluation module 131H may, in conjunction with the processor 131D, identify filter criteria for evaluating one or more assertions. The filter criteria may comprise a minimum acceptable strength score for one or more assertions. For example, the assertions model manager 131 may, in conjunction with the processor 131D, receive, from a relying entity 161, a request for a package of assertions including the criterion "only use data with a strength score greater than 80%." Alternatively, or additionally, the assertion evaluation module 131H may, in conjunction with the processor 131D, determine appropriate filter criteria for evaluating one or more assertions. For example, the assertions model manager may, in conjunction with the processor 131D, maintain a table of minimum acceptable strength scores corresponding to various types of relying entities 161, DI providers 121, and/or target entities 111 (e.g., 95% confidence required for border crossings; 30% confidence required for establishing a social media account, etc.).

In some embodiments, the packaging module 131I includes software and/or hardware configured to generate a package. The generated package may be a package of assertions. Alternatively, or additionally, the package may correspond to a set of types of identity attributes, which may be available from one or more DI providers.

A package may correspond to a plurality of assertions and/or identity attributes grouped together in a targeted fashion (e.g., for a particular relying entity 161 or type of relying entity). A package may further include supporting data such as a strength score for the package and/or strength scores for underlying assertions in the package. The packaging module 131I may, in conjunction with the processor 131D, generate a package by collecting the necessary underlying assertions and/or identity attributes. The packaging module 131I may, in conjunction with the processor 131D, convert the assertions and/or identity attributes into an appropriate format. The packaging module 131I may further include code configured to encrypt and/or digitally sign the package and/or underlying assertions. The packaging module may include code configured to obtain and store one or more data access tokens in association with a package, for use in retrieving identity attributes from one or more DI providers.

In some embodiments, the transmission module 131J may, in conjunction with the processor 131D, transmit information to the relying entity 161, based on the package. The transmission module 131J may include one or more APIs for sending and/or receiving data.

In some embodiments, the transmission module 131J may transmit a set of identity attributes and/or a package of assertions directly to the relying entity 161 (e.g., by a message). Alternatively, or additionally, the transmission module 131J may, in conjunction with the processor 131D, write data corresponding to the package to the ledger of assertions 141 and/or event log 151.

In some embodiments, the computer-readable medium 131F comprises code, executable by the processor 131D, to implement a method comprising: receiving, by a server computer from a relying entity, a request for identity attributes associated with a target entity, wherein the request for identity attributes includes a session identifier associated with the target entity and an identifier of the relying entity; validating, by the server computer, the request based on the session identifier; identifying, by the server computer, based on the identifier of the relying entity, a package defining types of identity attributes for the relying entity and a data access token associated with the package; based on validating the session identifier, transmitting, by the server computer to a digital identity provider, a request for a set of identity attributes corresponding to the package, the request comprising the data access token; and receiving, by the server computer from the digital identity provider, the set of identity attributes.

Returning to FIG. 1B, in some non-limiting embodiments, the assertions model manager 131 may include and/or be in communication with a ledger of assertions 141, an event log 151, and/or a key locker 171.

The ledger of assertions 141 may be a file, a collection of files, or a database for storing assertions data and/or identity attribute data. The ledger of assertions 141 may be a distributed ledger. The ledger of assertions, may for example, be implemented as an Ethereum blockchain, which is supported by the Ethereum Foundation (https://www.ethereum.org/). As another example, a Hyperledger may be used, which is an open-source Linux Foundation project (https://www.hyperledger.org/). Alternatively, or additionally, the assertions may be stored to a central database (e.g., maintained by the assertions model manager 131).

The ledger of assertions 141 may include a voting mechanism. For example, participants of the ledger of assertions 141, a distributed ledger, may vote on an assertion, package, authorizing entity, and/or DI provider. The votes may be based on, e.g., whether an assertion was useful or valid. Assertions may be selected for future use or rejected based on a number of votes. The number of votes required may vary based on the strength score of an authorizing entity, DI provider or assertion (e.g., the higher the strength score, the fewer votes required).

The event log 151 may be a file, a collection of files, or a database for storing event data. Each event may correspond to a request for information and/or a transmission of information. For example, an event may correspond to the assertions model manager 131 transmitting a set of identity attributes to the relying entity 161. For a particular event, the system may store event data such as the parties involved, a type of the event, a timestamp, etc. Each event may be encrypted using a set of cryptographic keys. An event may, for example, be encrypted using the cryptographic key of the target entity 111, the cryptographic key of the DI provider 121, and/or the cryptographic key of the relying entity 161. The event may further be encrypted with cryptographic keys assigned to other entities, such as one or more third party facilitators or technology providers (e.g., financial transaction processors and/or third-party token-based API services).

The event log 151 may be used to access event metadata for tasks such as dispute resolution, fraud detection, and/or analysis of user behaviors. By restricting access to the cryptographic keys needed to access one or more events, the event structure helps to keep data associated with a target entity private. For example, a private key held by the target entity 111 may be required to access event data, ensuring that event data is only available with explicit permission from the target entity 111. Access paths to the event data may be defined via a common API structure. The access paths may be established such that limited entities may access the events with limited amounts of data.

The ledger of assertions 141 and the event log 151 each can be stored in any suitable computer-readable storage medium and/or any suitable combination of computer-readable storage media. For example, the ledger of assertions 141 and/or the event log 151 can be stored in a database. Additionally or alternatively, the ledger of assertions 141 and/or the event log 151 can be maintained and stored in a distributed ledger, including but not limited to a blockchain and/or the like. For purpose of illustration and not limitation, with reference to FIG. 1A, the ledger of assertions 141 is depicted as a distributed ledger and the event log 151 is depicted as a database.

The key locker 171 may be a be a file, a collection of files, or a database for storing cryptographic keys. The key locker 171 may be cloud-based. The key locker 171 may store cryptographic keys assigned to various entities (e.g., a cryptographic key assigned to a target entity 111, a DI provider 121, a relying entity 161, etc.). The key locker 171 may organize the keys based on target entity 111, such that the keys of parties that have been involved in events in association with a target entity 111 are stored in a structure based on that target entity 111. This set of keys may be encrypted using a key of the target entity 111, such that a private key held by the target entity 111 is required to release the set of keys. Alternatively, or additionally, a pairwise key set may be assigned for each relationship. As an example, a pairwise key set may be assigned for the target entity 111 and the relying entity 161.

In some embodiments, one or more of the keys may encoded based on the Base58 model. Base58 is a type of binary-to-text encoding using fifty-eight easily distinguished alphanumeric symbols and a payload of arbitrary size. Additionally, one or more keys may be encoded in Wallet Import Format (WIF). WIF is a method of encoding a key which facilitates copying the key and allows for compression. Some keys may or may not be encoded and/or encrypted based on the appropriate security level.

Methods

Methods are described for securely providing a set of identity attributes to a relying entity. The set of identity attributes may be selected from one of many potential sets of identity attributes, based on the relying entity requesting the identity attributes. The identity attributes may be provided securely using a data access token and one or more hashing algorithms.

Flow for Providing at Least One Identity Attribute

Figure 2A:
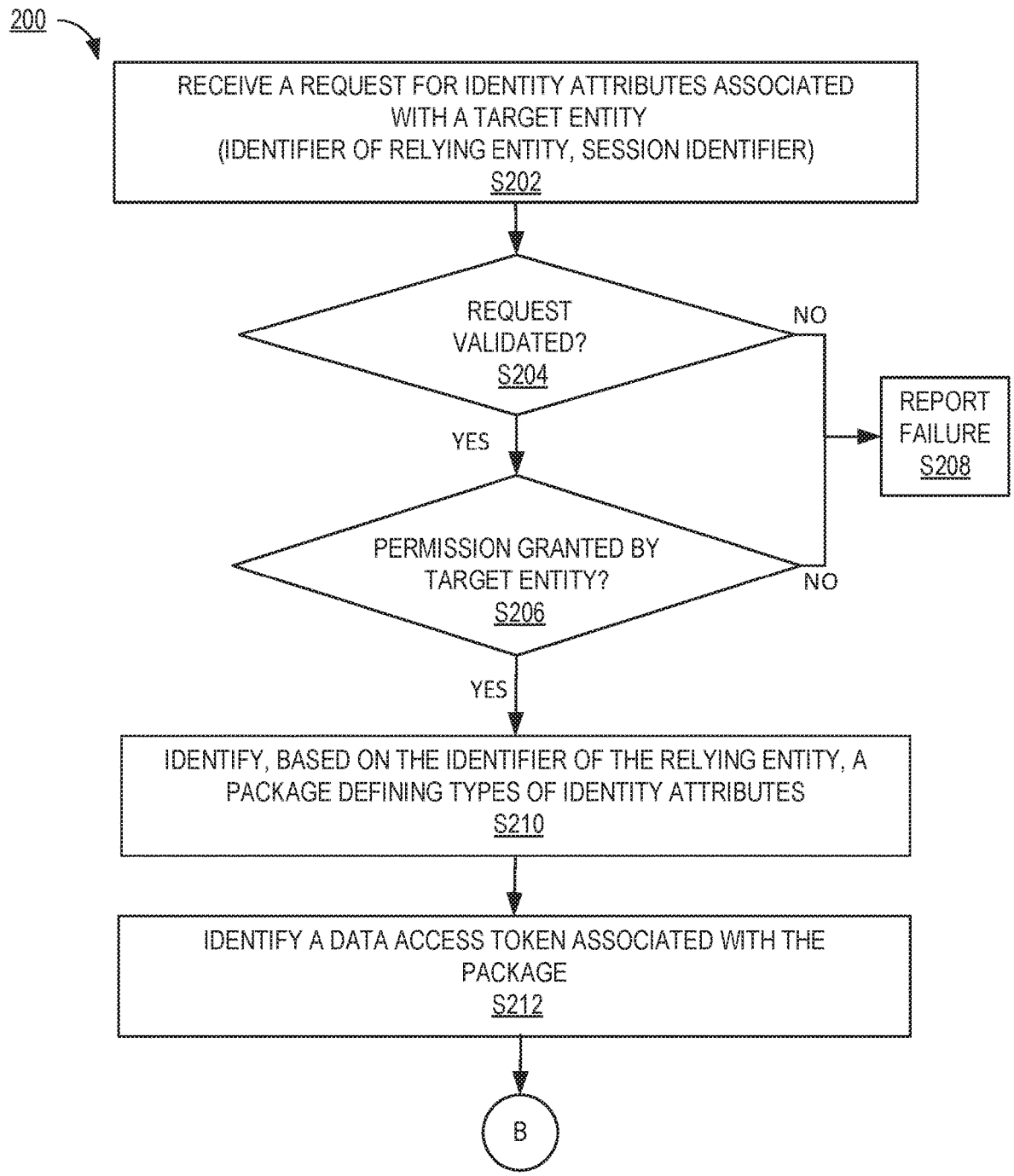
FIGS. 2A-2B show a flow diagram of a method of providing at least one identity attribute according to a non-limiting embodiment.
Figure 2B:
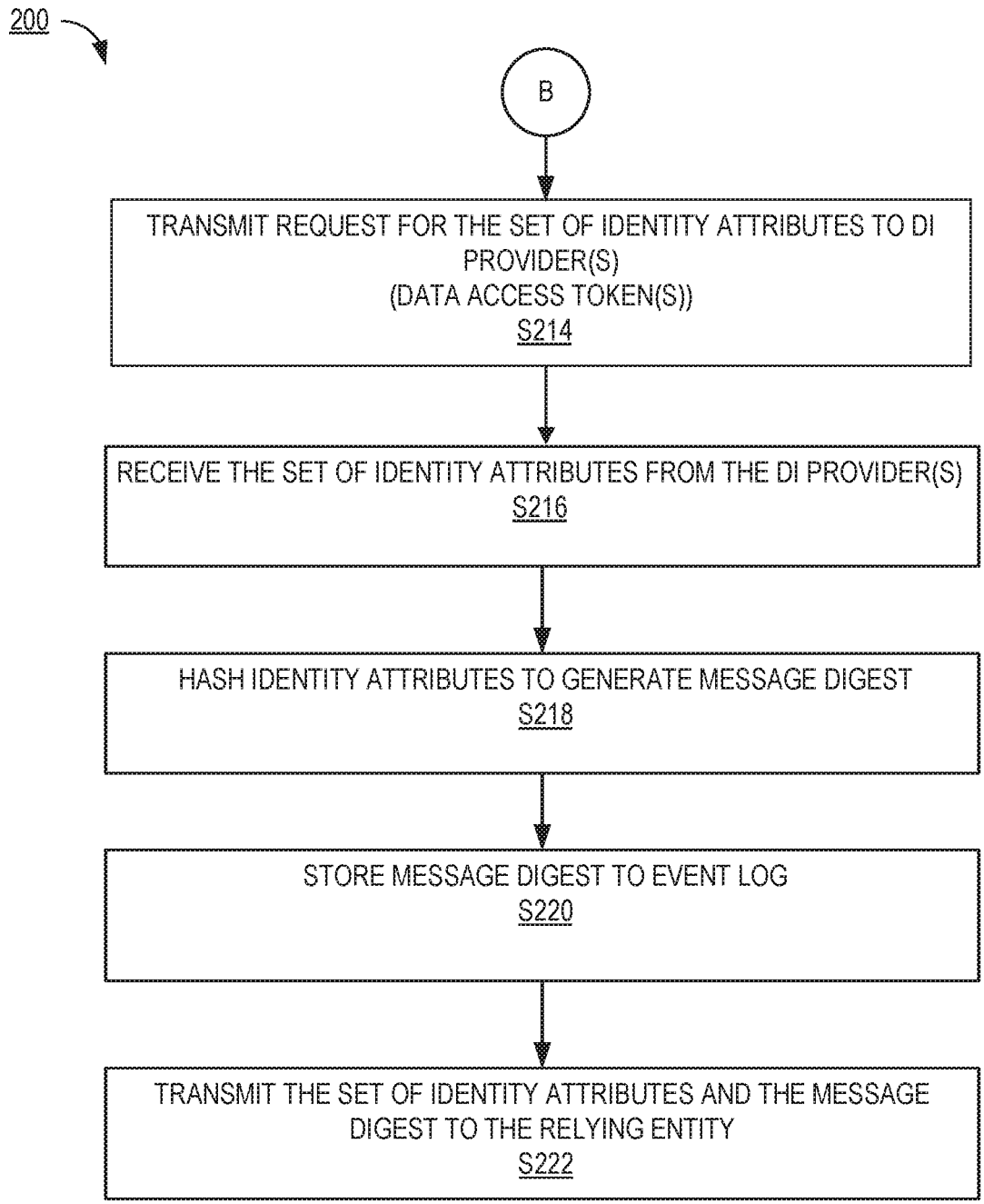

Referring now to FIGS. 2A-2B, a flow diagram of a method for providing at least one identity attribute 200 is shown according to a non-limiting embodiment. The flow diagram of FIGS. 2A-2B can best be understood from the point of view of the assertions model manager 131, as described in detail with respect to FIG. 1C.

At step S202, the assertions model manager may receive a request, from a relying entity, for identity attributes associated with a target entity. The assertions model manager may receive the request from the relying entity via an API push and/or a received message. The request may comprise an identifier of the relying entity and a session identifier associated with the target entity. The request may further comprise a URI indicating where the requested identity attribute(s) associated with the entity should be delivered.

In some embodiments, the received request may include additional parameters. The request may include an identifier of the target entity. The request may further indicate the desired identity attribute(s) for the target entity, the corresponding assertions that would be based on the desired identity attribute(s), and/or permissions provided by the target entity authorizing the assertions model manager to fetch and provide the identity attribute(s) to the relying entity. Alternatively, or additionally, the request may include entity type data identifying a type of entity associated with the relying entity. For example, the entity type data may comprise a merchant category code (MCC) and/or the like.

In some embodiments, the assertions model manager may communicate, to the relying entity, information characterizing a set of identity attributes that the relying entity is permitted to request. For example, the relying entity may be entitled to a subset of potential identity attributes based on its entity type (e.g., an insurance company may be entitled to name, address, car model, car make, and car year). Such a communication characterizing a package of identity attributes that the relying entity is permitted to request can also be logged in the event log (e.g., the assertions model manager may update the event log).

The assertions model manager may refrain from retrieving the identity attributes if the relying entity requests identity attributes which the relying entity is not permitted to receive. For example, if the relying entity is a bar, the relying entity may not be permitted to receive a social security number. The assertions model manager may refrain from performing operations S204-S222 upon determining that the relying entity has requested unpermitted identity attributes. Alternatively, the assertions model manager may provide a set of permitted identity attributes, while refraining from providing any unpermitted identity attributes requested.

At step S204, the assertions model manager may perform validation operations for the request, based on the session identifier. The assertions model manager may analyze the received session identifier to determine whether the session identifier is associated with the target entity (e.g., using an identifier of the target entity received in the request). If the assertions model manager confirms that the session identifier is associated with the target entity for which identity attributes are requested, then the assertions model manager may validate the request ("Yes" at step S204). If the assertions model manager determines that the session identifier is not associated with the target entity for which the identity attributes are requested, then the assertions model manager may not validate the request ("No" at step S204).

If the request is not validated, then the assertions model manager may report a failure (step S208). The assertions model manager may, for example, report a failure by transmitting a notification to the relying entity (e.g., invalid request, request denied, etc.).

At step S206, the assertions model manager may request permission, from the target entity, to provide identity attributes to the relying entity. The assertions model manager may transmit a request to the target entity, e.g., via email, text message, display of a modal, and/or the like. Alternatively, or additionally, the assertions model manager may request step-up authentication from the target entity, e.g., by requesting that the target entity log in to a preconfigured account with the assertions model manager.

If the permission is not granted, then the assertions model manager may report a failure (step S208). The assertions model manager may, for example, report a failure by transmitting a notification to the relying entity (e.g., invalid request, request denied, etc.). If permission is granted, then the assertions model manager may proceed to step S210.

At step S210, the assertions model manager may identify, based on the identifier of the relying entity, a package defining types of identity attributes for the relying entity. The assertions model manager may identity the package for the particular relying entity based on the received identifier of the relying entity. The assertions model manager may have stored a variety of pre-configured packages, at least one of which may be associated with that particular relying entity. In the event multiple packages are associated with the relying entity, the assertions model manager may use additional data in selecting the appropriate package. For example, data received with the request for identity attributes may specify that the context is ecommerce, and the assertions model manager may use this context to select one of two potential packages for the relying entity.

At step S212, the assertions model manager may identify one or more data access tokens associated with the identified package. In some embodiments, a particular package may map to one data access token for use in retrieving the identity attributes associated with that package from a corresponding DI provider. Alternatively, different identity attributes corresponding to the package may map to one or more different DI providers. For example, a package for a home improvement loan application may map to three different DI providers for retrieving three different respective identity attributes: Bank A to provide an account number related to the target entity's assets, Bank B to provide an account number associated with the target entity's mortgage, and the county assessor to provide home ownership information for an associated parcel. The assertions model manager may identify the appropriate DI provider(s) corresponding to the data access token(s) (e.g., based on a DI provider ID stored in association with the token, or via the information within the token).

At step S214, the assertions model manager may transmit a request for the set of identity attributes to the DI provider. The request may comprise the data access token(s). For example, the assertions model manager may POST a data access token to an API exposed by a DI provider and/or a third-party token-based API service.

The DI provider(s) may utilize the data access token(s) to retrieve one or more identity attributes. Each DI provider may provide the assertions model manager with a set of identity attribute(s) associated with a particular data access token.

At step S216, the assertions model manager may receive the set of identity attributes from the DI provider(s). The identity attributes may be received via API(s) of the DI provider(s) and/or one or more third-party token-based API services. If the package corresponds to multiple data access tokens/DI providers, then the assertions model manager may combine the various received identity attributes according to the specifications of the package.

At step S218, the assertions model manager may hash the set of identity attributes to generate a message digest. Alternatively, or additionally, the assertions mode manager may hash the attributes to generate a Merkle tree as described above with respect to FIG. 1A. The assertions model manager may encrypt the message digest and/or Merkle tree/Merkle root, e.g., with a public key of the target entity.

At step S220, the assertions model manager may store the message digest and/or Merkle tree to the event log. The assertions model manager may create an event corresponding to the transmittal of the identity attributes. In some embodiments, the message digest and/or Merkle tree may be encrypted using the key of the target entity, such that the underlying identity attributes can only be retrieved at the behest of the target entity. The message digest and/or Merkle tree may be stored in association with related information, such as an identifier of the assertions model.

At step S222, the assertions model manager may transmit the set of identity attributes and the message digest to the relying entity. The assertions model manager may initially prepare a message (e.g., a JSON message) containing the relevant identity attributes. The message may further include the message digest and/or Merkle root. The message may further include additional data, such as an identifier of the DI provider, a package identifier, and/or the like. The assertions model manager may transmit the identity attributes and the message digest (and any other data to be included) via an API push and/or as a message to the relying entity. The assertions model manager may transmit the information to the URI specified by the receiving entity in the received request.

Storing Assertion Values and a Data Access Token

Figure 3:
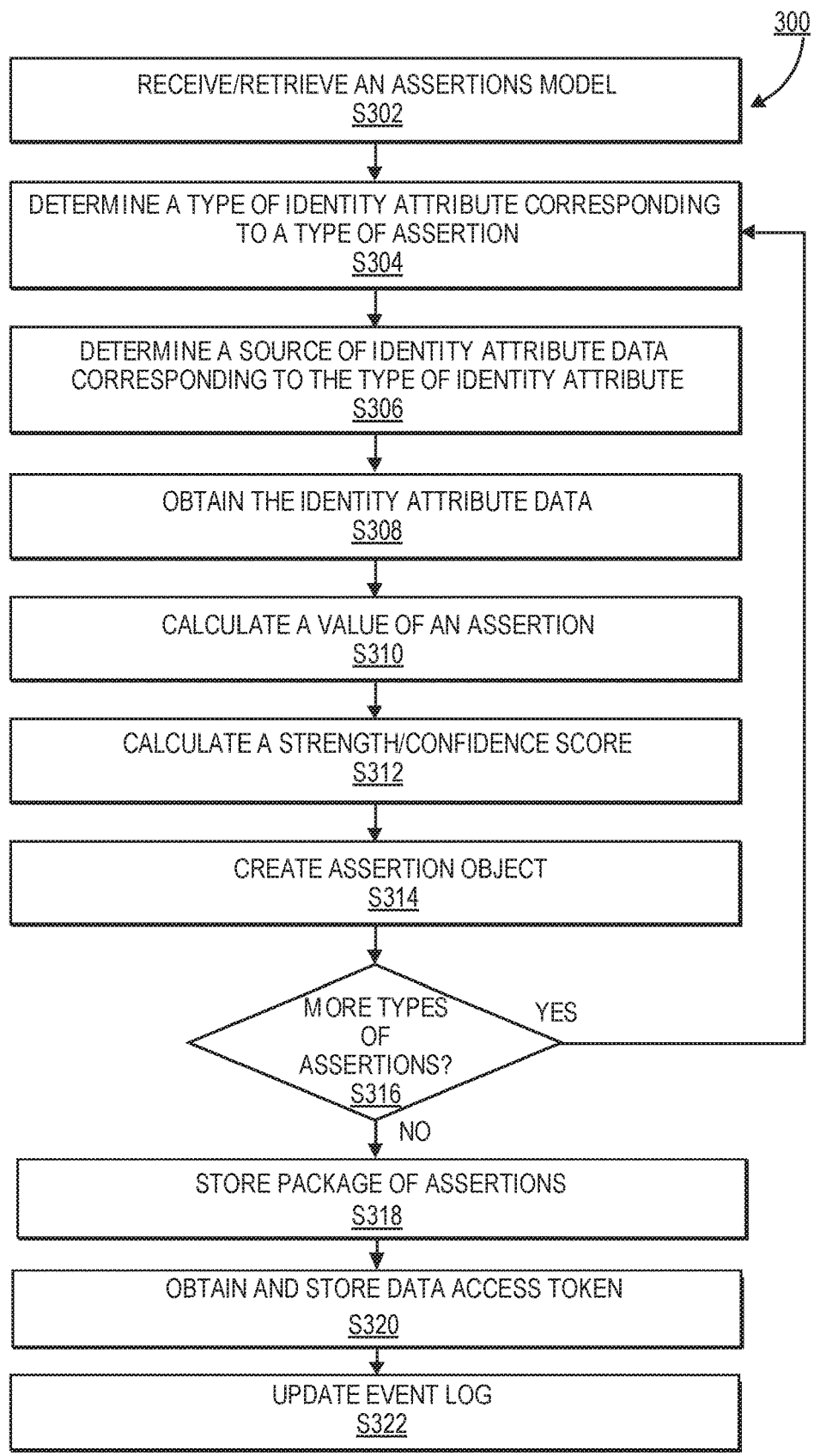
FIG. 3 is flow diagram for a method of storing a package of assertions in association with a data access token according to a non-limiting embodiment.

Referring now to FIG. 3, a flow diagram of a method 300 for storing assertion values in association with a data access token is shown according to a non-limiting embodiment. FIG. 3 can best be understood from the point of view of the assertions model manager 131, as described in detail with respect to FIG. 1C.

At step S302, the assertions model manager may receive or retrieve an assertions model. For example, the assertions model manager may retrieve data associated with the assertions model from the assertions model database. Additionally or alternatively, the assertions model manager may retrieve the data associated with the assertions model over a network from an external data storage, including but not limited to a database, a distributed ledger, a blockchain, and/or the like.

After step S302, the assertions model manager may identify a set of types of assertions corresponding to the assertions model. For example, the assertions model manager may determine that the assertions model includes three types of assertions: whether the target entity is at least 18 years of age, whether the target entity has a valid driver's license, and whether the target entity has a valid payment instrument. The assertions model manager may identify the types of assertions by analyzing the assertions model.

At step S304, the assertions model manager may determine a type of identity attribute corresponding to a type of assertion. The assertions model manager may use the assertions model to determine a type of identity attribute corresponding to each type of assertion of the assertions model. Each type of assertion of the assertions model may map to one or more respective types of identity attributes. For example, one type of assertion in the assertions model is whether the target entity is old enough to rent an automobile in the country in which the relying entity is located. This type of assertion maps to two types of identity attributes available from the DI providers: a date of birth of the target entity, and the location of the relying entity.

At step S306, the assertions model manager may determine one or more sources of identity attribute data corresponding to the type of identity attribute (e.g., DI providers and/or references from which the identify attribute data may be obtained). For example, the assertions model may include a list of valid sources of information for the types of assertions contained therein. As another example, a list of valid sources associated with one or more assertions models can be maintained and stored by the assertions model manager.

As a non-limiting example, the type of assertion is whether a target entity is old enough to rent an automobile. The type of identity attribute of interest is the date of birth of the target entity. A list of valid sources of date of birth information may include government documents (e.g., a driver's license, birth certificate, passport, and/or the like), a government database, business organization records (e.g., of an issuer, a transaction service provider, and/or the like), and/or the like.

Additionally or alternatively, the assertions model manager may identify a verification method for verifying the type of identity attribute. As examples, the verification method may include inspection of documentation by the DI provider, verification by a business organization (e.g., a third-party service), and/or verification by a government agency. The assertions model manager may, for example, identify verifications stored in association with the respective types of identity attributes.

At step S308, the assertions model manager may obtain the identity attribute data. The assertions model manager may communicate with a DI provider to obtain the identity attribute data associated with the target entity corresponding to the type of identity attribute in the assertions model. The assertions model manager may receive the identity attribute data, for example, via an API exposed to the DI provider. The assertions model manager may further retrieve, from one or more DI providers, information about the reference from which the data was obtained.

As a non-limiting example, the assertions model manager is generating an assertion: whether a target entity is old enough to rent an automobile. The type of identity attribute of interest is the date of birth of the target entity. The identity attribute data associated with the date of birth may be a numerical representation of the date of birth of the target entity, a bit or bit string indicating whether the entity is above a certain age threshold (e.g., the minimum age to rent an automobile) or in a certain age category (e.g., under 18, between 18 and 25, over 25), and/or the like. Additionally, the identity attribute data may include the source of the date of birth data (e.g., visual inspection of a driver's license by the DI provider).

At step S310, the assertions model manager may calculate a value of the assertion. The assertions model manager may, for example, use an equation or algorithm stored in association with the assertions model to compute a value of the assertion based on the identity attribute data.

Continuing with the above example, the type of assertion is whether a target entity is old enough to rent an automobile. The type of identity attribute of interest is the date of birth of the target entity. An assertion value specifying whether the target entity is old enough to rent an automobile can be calculated based on the date of birth information provided by the DI provider using the following algorithm:

{"OfAgeToRentAutoInUSA"::="Yes" iff "Current date"-"Verified date of birth"≥25 years else "No"} where "OfAgeToRentAutoInUSA" is the assertion value specifying whether the target entity is old enough to rent an automobile in the USA, "Yes" is the value if the target entity is old enough, "No" is the value if the target entity is not old enough, "Current date" is the date on which the calculation is made, and "Verified date of birth" is the date of birth of the target entity as provided by the DI provider after verification of the source of that data.

At step S312, the assertions model manager may calculate a strength score associated with the value of the assertion. The strength score of the assertion may directly map to a strength score of the DI provider from which the assertion or underlying identity attribute data was obtained. Alternatively, or additionally, the strength score may be based on additional criteria. For example, an assertion related to income may require more supporting data, to receive a comparable strength score, as compared to an assertion related to height.

As a non-limiting example, the strength score may be calculated based on the DI provider's verification process as follows:

Strength Score $(DIProvider) = S_{ref} + S_{ver} + S_{link}/2$ $S_{ref}$ is a strength score of the references used (e.g., a driver's license, utility bill, passport, etc. may each be given a score). $S_{ver}$ is a score based on how the DI provider validates the references (e.g., the score may increase if a DI provider confirms a first reference using a second reference). $S_{link}$ is a score based on how the DI provider links the reference to the entity (e.g., the link score may be incremented if the DI provider visually inspects an individual to confirm she is the individual pictured in a photo ID). The result, a strength score of the DI provider, may be attached to every assertion made by the DI provider. As another non-limiting example, the strength score may be calculated based on a model such as a NIST model. The NIST model is described in NIST Special Publication 800-63A, Digital Identity Guidelines: Enrollment and Identity Proofing Requirements, U.S. Department of Commerce (updated Nov. 15, 2017), available at https://doi.org/10.6028/NIST.SP.800-63a, which is hereby incorporated herein in its entirety.

At step S314, the assertions model manager may create an assertion object. Each assertion object may include the value of the assertion and/or additional data. For example, an assertion object may include an assertion value, a name of the assertion, a strength score of the assertion, an expiration date of the assertion, etc.

Creating the assertion object may comprise calculating and including an expiration date of the assertion. For example, the assertion may expire after a particular amount of time elapses (e.g., the assertion should be recomputed biannually), when the source of the information expires (e.g. a driver's license). If the assertion will not expire, then the expiration date can be omitted or the expiration data can have a value of null, "none," 0, and/or the like.

In some embodiments, the assertions model manager may store the generated assertion and/or assertion object to a temporary package of assertions. Assertions and/or assertion objects may be temporarily stored to a temporary package of assertions until the full package of assertions corresponding to the assertions model is completed.

At step S316, the assertions model manager may determine whether there are remaining types of assertions in the assertions model for which an assertion has not yet been created. If there is at least one remaining type of assertion in the assertions model for which an assertion has not yet been created, then the next type of assertion can be selected and the process can be repeated (i.e., repeat steps S304-S316 until assertions and/or assertion objects corresponding to each type of assertion and/or assertion object in the assertions model have been created).

At step S318, the assertions model manager may generate and store a package of assertions. After repeating steps S304-S316 one or more times, the assertions model manager may combine the assertions into a package of assertions. The assertions model manager may combine the assertions into a data packet. The assertions model manager may generate additional data and add the additional data to the data packet to form the package of assertions (e.g., assertion model name, assertion score, etc.).

The assertions model manager may store the package of assertions to the ledger of assertions. The assertions model manager may cluster the assertions data under an index of data corresponding to the target entity. The index may be encrypted using a public key assigned to the target entity. A private key assigned to the target entity may be required to access any assertions data associated with the target entity. The data may be periodically refreshed or updated. For example, the assertions may be validated/updated with each request for assertions. As another example, the assertions may be validated/updated every five days.

At step S320, the assertions model manager may obtain and store one or more data access tokens in association with the package of assertions. The assertions model manager may request, via an API associated with the DI provider(s), a data access token for use in retrieving the underlying identity attributes which are basis for the assertions in the package of assertions. In some embodiments, the assertions model manager may obtain one data access token for retrieving all the identity attributes corresponding to a package of assertions. For example, assertions package A includes three assertions which were generated based on three corresponding identity attributes retrieved from DI provider A. DI provider A may issue a data access token to the assertions model manager for retrieving those three identity attributes.

Alternatively, or additionally, for a given package of assertions, the assertions model manager may obtain several tokens corresponding to one or more DI providers. For example, assertions package B includes two assertions—the first assertion is "Mary Jones is over 21 years old" and the second assertion is "Mary Jones has a valid payment account." The first assertion was generated based on information obtained from a department of motor vehicles (DMV), and the second assertion was generated based on information obtained from a bank. The first assertion is stored in connection with a data token for retrieving Mary's date of birth from the Oregon DMV. The second assertion is stored in connection with a second data token for retrieving Mary's bank account details (e.g., bank account number) from the bank.

In some embodiments, the assertions model manager may obtain a data access token by submitting a request to a DI provider, or a service provider that issues tokens on behalf of the DI provider. This may be executed, for example, by posting a request to an API, or by configuring a token request using an interface. The assertions model manager may include, in the token request, information such as the identity attributes to be retrieved using the token, an identifier of the target entity, an identifier of the assertions model manager, etc. The DI provider or service provider may transmit a response to the assertions model manager comprising a data access token.

In some embodiments, each data access token may indicate one or more of: the corresponding assertion, the specific DI provider that provided the assertion, the identity attribute(s) possessed by the specific DI provider that were used to generate those assertions, and/or the location of those identity attribute(s). A data access token may also be indexed to the target entity (e.g., based on an identifier of the target entity). The assertions model manager may store the data access token(s) to the ledger of assertions in association with the package of assertions. In some embodiments, the assertions model manager may further store a DI provider identifier in association with the data access token and/or package of assertions.

At step S322, the assertions model manager may update the event log. The assertions model manager may generate an event, associated with the generation of the package of assertions, in the event log. The assertions model manager may store additional data associated with the event in the event log such as event type, event value, etc. The assertions model manager may encrypt each event using multiple public keys assigned to multiple entities. For example, the event may be associated with the target entity, the requesting entity, two DI providers, and two processors. Each of these entities may be assigned a public key, which is used to encrypt the event.

ADVANTAGES; EXTENSIONS

The teachings of this disclosure have a number of advantages. Assertions models, customized for different types of relying entities, may be used to generate packages for a given target entity. The packages may be tied to identity attributes, which may be made available to different types of relying entities in a secured manner. As a result, only the appropriate relying entities will be able to retrieve appropriate corresponding identity attributes. These packages may be generated at an initial time. By using preexisting, tailored packages, the relying entities can quickly be granted information. In some cases, there is no need to recompute a given package for multiple relying entities of a same type. Hence, computational time and resources are saved while ensuring a high degree of privacy and security.

The teachings of this disclosure have a number of additional advantages. The assertions model manager may refrain from storing the identity attributes. Instead, the assertions model manager may store packages corresponding to the identity attributes, along with one or more data access tokens for retrieving the identity attributes associated with a given package. Accordingly, privacy and security are improved, as compared to prior systems where personally identifiable information may be stored. Further, the assertions model manager may create and store a hashed message digest, and/or a Merkle tree, which can be used to determine whether the attributes have been altered while still keeping the underlying information hidden.

Further, the packages may be stored as entries to a distributed ledger. Using a distributed ledger approach provides numerous advantages. The data is provable, in that entries can be attributable to specific entities cryptographically. The data is non-repudiable, in that entries cannot later be altered or deleted. The data is sequential, as the order of every entry is provable before, or after, every other entry. The data is ubiquitous and available from any reasonable vector. The data is survivable, even if large numbers of the distributed nodes fail or are under attack. The data is highly available, with high throughput. The data is trustable by the entities involved.

The teachings of the present disclosure provide several advantages for the target entity for which information is being requested. The target entity can control privacy by customizing what information can be revealed to what relying entities. Further, various different types of information required by various relying entities is streamlined into a single channel. The target entity can provide assent, and, based on the type of the relying entity, the appropriate information can be extracted without necessarily requiring further input from the target entity.

The teachings of the present disclosure provide several advantages for the relying entity requesting information. First, by providing the above-referenced advantages to the target entities (e.g., customers of the relying entity, employees of the relying entity, etc.), the relying entity is providing a better experience for the target entity. In the case of a merchant, increased customer experience may lead to increased sales. Further, the teachings of the present disclosure can provide increased fraud protection by verifying data across multiple channels, using advanced cryptographic techniques. Additionally, the relying entity can provide a simple request, used to retrieve various relevant identity attributes, without needing to specify each identity attribute in the request.

It should be understood that any of the embodiments be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment may be created using a data signal encoded with such programs. Computer readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the embodiments will become apparent to those skilled in the art upon review of the disclosure. The scope of the embodiments should, therefore, be determined not with reference to the above description, but instead should be determined with reference to the pending claims along with their full scope or equivalents.

Although embodiments have been described in detail for the purpose of illustration based on what are currently considered to be practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

One or more features from any embodiment may be combined with one or more features of any other embodiment without departing from the teachings of this disclosure.

As used herein, the use of "a," "an," or "the" is intended to mean "at least one," unless specifically indicated to the contrary.

What is claimed is:

1. A method comprising:
    receiving, by a server computer from a relying entity computer associated with a relying entity, a request for identity attributes associated with a target entity, wherein the request for identity attributes includes a session identifier associated with the target entity and an identifier of the relying entity;
    validating, by the server computer, the request based on the session identifier;
    identifying, by the server computer, based on the identifier of the relying entity, a package defining types of identity attributes for the relying entity and a data access token associated with the package;
    based on validating the request, transmitting, by the server computer to a digital identity provider computer, a request for a set of identity attributes corresponding to the package, the request comprising the data access token; and
    receiving, by the server computer from the digital identity provider computer, the set of identity attributes.

2. The method of claim 1, further comprising transmitting, by the server computer to the relying entity computer, the set of identity attributes.

3. The method of claim 2, further comprising generating an event in an event log, the event being associated with the transmitting of the set of identity attributes.

4. The method of claim 2, wherein:
    the received request for the identity attributes further includes a Uniform Resource Identifier (URI) which identifies a location to transmit the identity attributes; and
    transmitting the identity attributes to the relying entity computer includes transmitting the set of identity attributes to the URI.

5. The method of claim 1, further comprising:
    computing, by the server computer via a hash function and the set of identity attributes, a message digest; and
    transmitting, by the server computer to the relying entity computer, the set of identity attributes and the message digest.

6. The method of claim 5, further comprising generating a plurality of hash values by at least:
    hashing a first identity attribute, of the set of identity attributes, to generate a first hash value;
    hashing a second identity attribute, of the set of identity attributes, to generate a second hash value; and
    generating a third hash value by hashing the first hash value and the second hash value.

7. The method of claim 6, further comprising storing, by the server computer, the plurality of hash values to an event log.

8. The method of claim 1, wherein:
    the identified package comprises a package of assertions associated with the target entity; and
    the package of assertions comprises a set of assertions about the target entity, wherein the set of identity attributes are basis for the set of assertions.

9. The method of claim 8, wherein the package of assertions specifies a set of assertion types corresponding to the set of assertions, and the method further comprises, prior to receiving the request from the relying entity:
    for each assertion type, of the set of assertion types, generating the set of assertions by:
    determining a type of identity attribute corresponding to the assertion type;
    obtaining an identity attribute, of the set of identity attributes, corresponding to the determined type of identity attribute;
    calculating an assertion value corresponding to the assertion type based on the obtained identity attribute; and
    storing the assertion value.

10. The method of claim 9, wherein a plurality of assertion values are stored as the package of assertions in association with the data access token for retrieving the corresponding identity attributes.

11. The method of claim 9, wherein the server computer refrains from storing the corresponding identity attributes.

12. The method of claim 1, further comprising requesting, from the target entity, permission to access the identity attributes.

13. The method of claim 12, further comprising, prior to receiving the request for identity attributes associated with a target entity:
    receiving, by the server computer from the relying entity computer, a request for assertions associated with the target entity, wherein the request for assertions includes the identifier of the relying entity and an identifier of the target entity;

identifying, by the server computer based on the identifier of the relying entity, the package defining types of identity attributes for the relying entity, the package further defining types of assertions for the relying entity;

determining a set of assertion values associated with the target entity, based on the types of assertions defined by the package;

generating a package of assertions associated with the target entity, based on the set of assertion values for the target entity; and transmitting, to the relying entity computer, the package of assertions associated with the target entity.

14. A system comprising a server computer comprising:
a processor; and
a non-transitory computer-readable medium comprising code, executable by the processor, to implement a method comprising:

receiving, from a relying entity computer associated with a relying entity, a request for identity attributes associated with a target entity, wherein the request for identity attributes includes a session identifier associated with the target entity and an identifier of the relying entity;

validating the request based on the session identifier;

identifying, based on the identifier of the relying entity, a package defining types of identity attributes for the relying entity and a data access token associated with the package;

based on validating the request, transmitting, to a digital identity provider computer, a request for a set of identity attributes corresponding to the package, the request comprising the data access token; and receiving, from the digital identity provider computer, the set of identity attributes.

15. A method comprising:
generating, by a client computer of a relying entity, a request for a plurality of identity attributes associated with a target entity, wherein the request for identity attributes includes a session identifier associated with the target entity and an identifier of the relying entity;

transmitting, by the client computer, the request to a server computer;

thereby causing the server computer to:
validate the request based on the session identifier;
identify, based on the identifier of the relying entity, a package defining types of identity attributes for the relying entity and a data access token associated with the package,
transmit, to a digital identity provider, a request for a set of identity attributes corresponding to the package, the request comprising the data access token,
receive, from the digital identity provider, the set of identity attributes, and
transmit, to the client computer of the relying entity, the set of identity attributes; and
receiving, by the client computer of the relying entity, the set of identity attributes.

16. The method of claim 15, wherein:
the request for the identity attributes further includes a Uniform Resource Identifier (URI) which identifies a location to transmit the set of identity attributes; and
the client computer of the relying entity receives the identity attributes via the URI.

17. The method of claim 15, further comprising:
establishing, by the client computer, a communication session with the target entity;
generating, by the client computer, the session identifier for the communication session;
transmitting, by the client computer to the target entity during the communication session, a request for permission to retrieve the identity attributes; and
receiving, by the client computer from the target entity during the communication session, permission to retrieve the identity attributes.

18. The method of claim 15, further comprising:
receiving, by the client computer, a message digest with the set of identity attributes,
wherein the message digest was computed by the server computer via a hash function and the set of identity attributes.

19. The method of claim 15, further comprising using the session identifier and the set of identity attributes to complete a task.

20. The method of claim 15, wherein the server computer determines an assertions model based on the identifier of the relying entity, and determines the set of identity attributes associated with the relying entity based on the assertions model.

* * * * *